US009778416B2

(12) United States Patent
Meade et al.

(10) Patent No.: US 9,778,416 B2
(45) Date of Patent: Oct. 3, 2017

(54) METHOD AND STRUCTURE PROVIDING A FRONT-END-OF-LINE AND A BACK-END-OF-LINE COUPLED WAVEGUIDES

(71) Applicants: MICRON TECHNOLOGY, INC., Boise, ID (US); Massachusetts Institute of Technology, Cambridge, MA (US)

(72) Inventors: Roy Meade, Boise, ID (US); Jason Orcutt, Katonah, NY (US); Milos Popovic, Boulder, CO (US); Jeffrey Shainline, Boulder, CO (US); Zvi Sternberg, Metar (IL); Vladimir Stojanovic, Berkeley, CA (US); Ofer Tehar-Zahav, Hadera (IL)

(73) Assignees: Micron Technology, Inc., Boise, ID (US); Massachusetts Institute of Technology, Cambridge, MA (US)

( * ) Notice: Subject to any disclaimer, the term of this patent is extended or adjusted under 35 U.S.C. 154(b) by 133 days.

(21) Appl. No.: 14/467,531

(22) Filed: Aug. 25, 2014

(65) Prior Publication Data
US 2016/0054520 A1 Feb. 25, 2016

(51) Int. Cl.
G02B 6/12 (2006.01)
G02B 6/122 (2006.01)
G02F 1/025 (2006.01)

(52) U.S. Cl.
CPC ....... *G02B 6/1228* (2013.01); *G02B 6/12004* (2013.01); *G02F 1/025* (2013.01); *G02B 2006/12061* (2013.01); *G02B 2006/12121* (2013.01); *G02B 2006/12123* (2013.01); *G02B 2006/12142* (2013.01); *G02F 2201/06* (2013.01); *G02F 2202/104* (2013.01)

(58) Field of Classification Search
CPC .............. G02B 6/12004; G02B 6/1228; G02B 6/29331; G02B 27/56; G02B 2006/12061
See application file for complete search history.

(56) References Cited

U.S. PATENT DOCUMENTS

| | | | | |
|---|---|---|---|---|
| 4,097,118 A * | 6/1978 | Hammer | ................... | G02B 6/30 385/30 |
| 6,631,225 B2 * | 10/2003 | Lee | ......................... | B82Y 20/00 385/28 |
| 7,088,890 B2 * | 8/2006 | Liu | ......................... | B82Y 20/00 385/129 |
| 7,095,920 B1 * | 8/2006 | Little | .................. | G02B 6/12002 385/131 |

(Continued)

OTHER PUBLICATIONS

Bogaerts, W., et al. "Photonic integrated circuits in Silicon-on-Insulator", Photonic Research Group, Ghent University, pp. 151-153.

(Continued)

*Primary Examiner* — Daniel Petkovsek
(74) *Attorney, Agent, or Firm* — Perkins Coie LLP

(57) ABSTRACT

An integrated structure and method of formation provide a lower level waveguide having a core of a first material and a higher level waveguide having a core of a second material and a coupling region for coupling the two waveguides together. The different core materials provided different coupled waveguides having different light loss characteristics.

18 Claims, 19 Drawing Sheets

(56) References Cited

U.S. PATENT DOCUMENTS

| | | | | |
|---|---|---|---|---|
| 7,515,793 B2* | 4/2009 | Dehlinger | ............ | G02B 6/12004 385/129 |
| 8,320,721 B2* | 11/2012 | Cevini | .................... | G02B 6/305 385/131 |
| 8,483,528 B2* | 7/2013 | Socci | ...................... | G02B 6/305 385/131 |
| 8,787,712 B2* | 7/2014 | Grondin | .................. | B82Y 20/00 385/14 |
| 9,316,792 B2* | 4/2016 | Park | ......................... | G02B 6/305 |
| 9,377,587 B2* | 6/2016 | Taylor | ..................... | G02B 6/421 |

OTHER PUBLICATIONS

Yamada, Koji, "Chapter 1, Silicon Photonic Wire Waveguides: Fundamentals and Applications", Topics in Applied Physics 119, 1-29 (2011).

Preston, et al., "Waveguide-integrated telecom-wavelength photodiode in deposited silicon", Optics Letters, vol. 36, No. 1, Jan. 1, 2011.

Knights, et al., "Silicon-on-insulator waveguide photodetector with self-ion-implantation-engineered-enhanced infrared response", J. Vac. Sci, Technol. A 24(3), May/Jun. 2006.

Geis, et al., "All silicon infrared photodiodes: photo response and effects of processing temperature", Optics Express, Dec. 10, 2007, vol. 15, No. 25.

Marsh, John, "Quantum well intermixing", Semicond. Sci. Technol. 8 (1993), 1136-1155.

\* cited by examiner

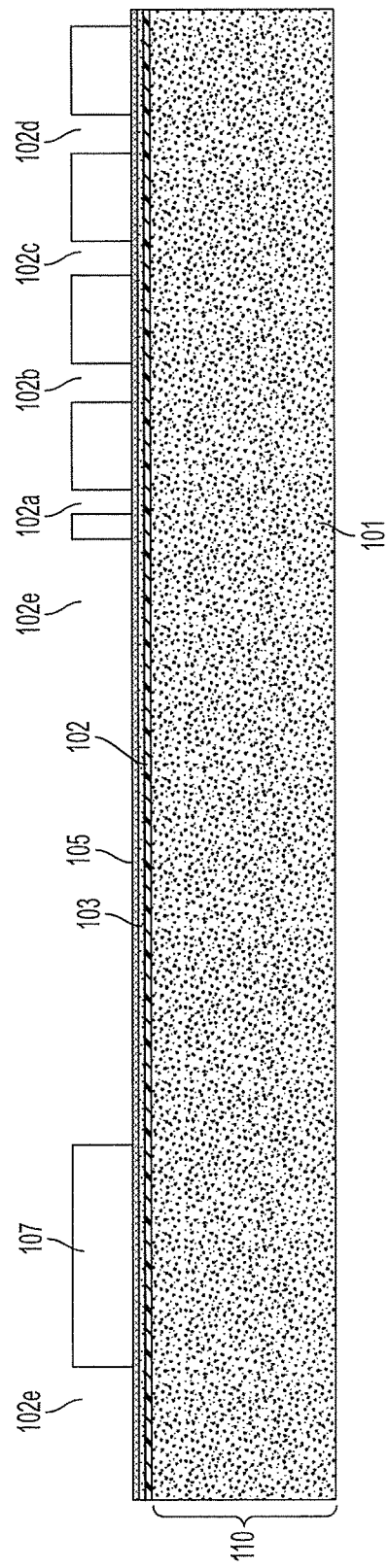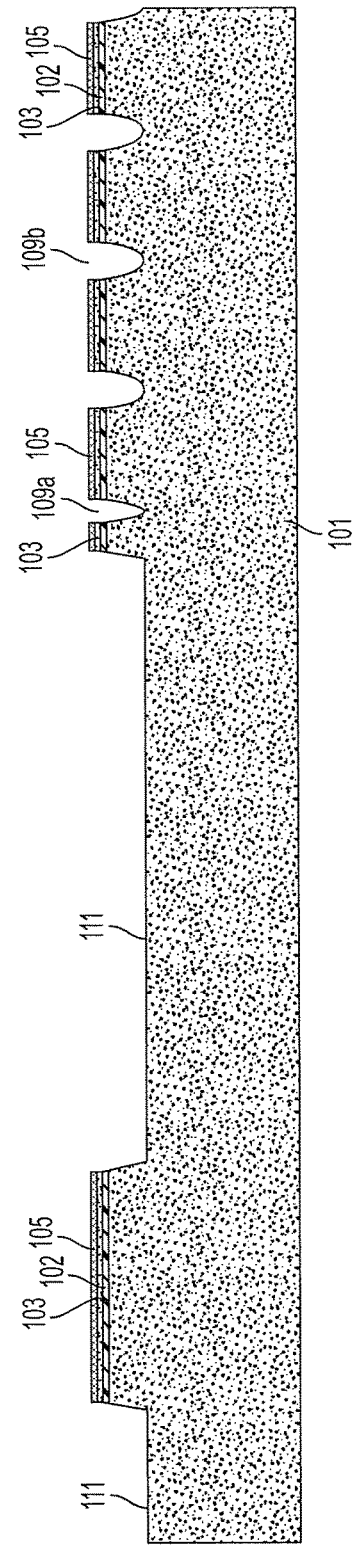

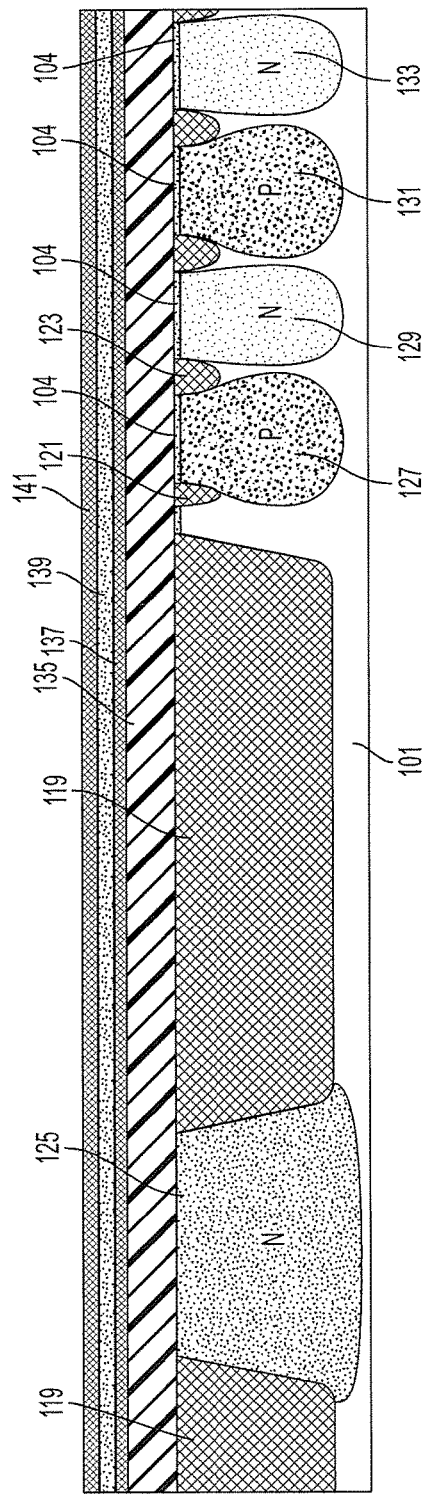
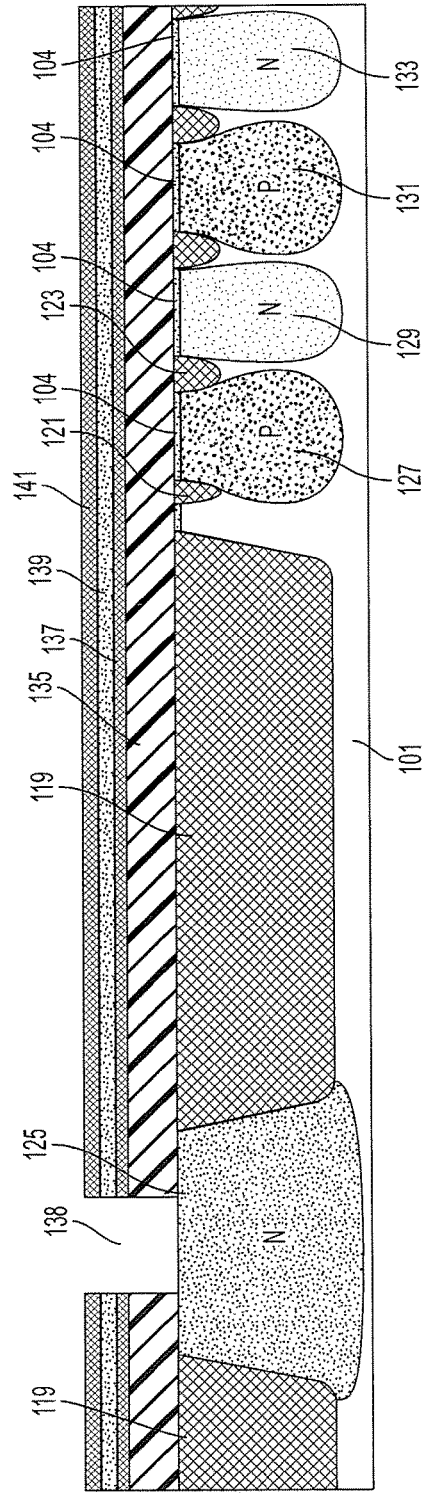
FIG. 9
FIG. 10

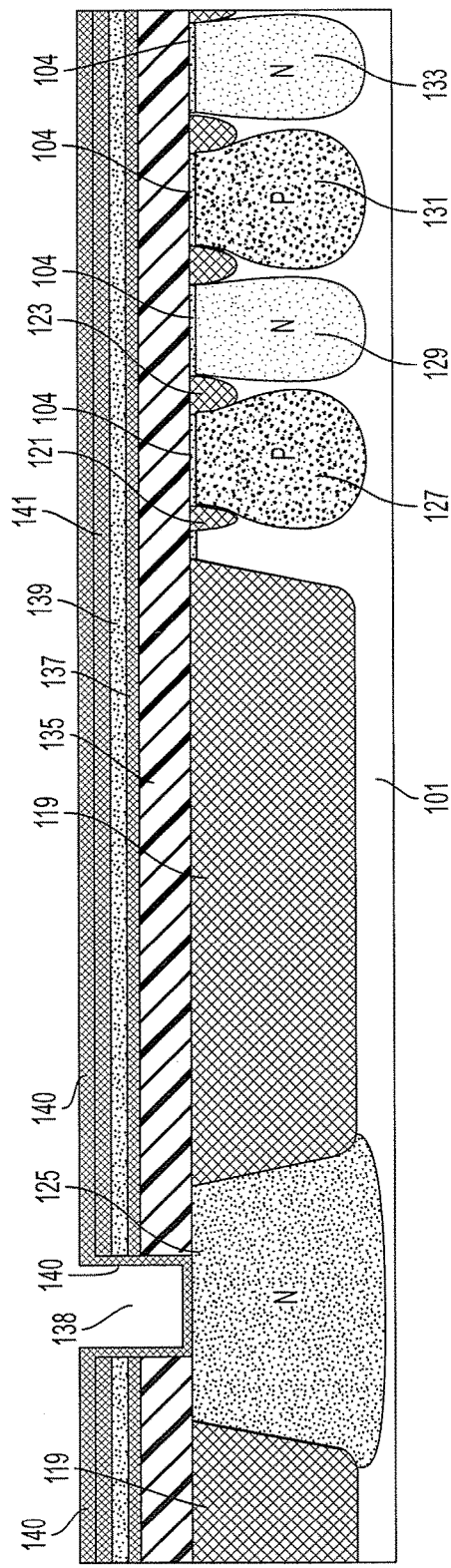
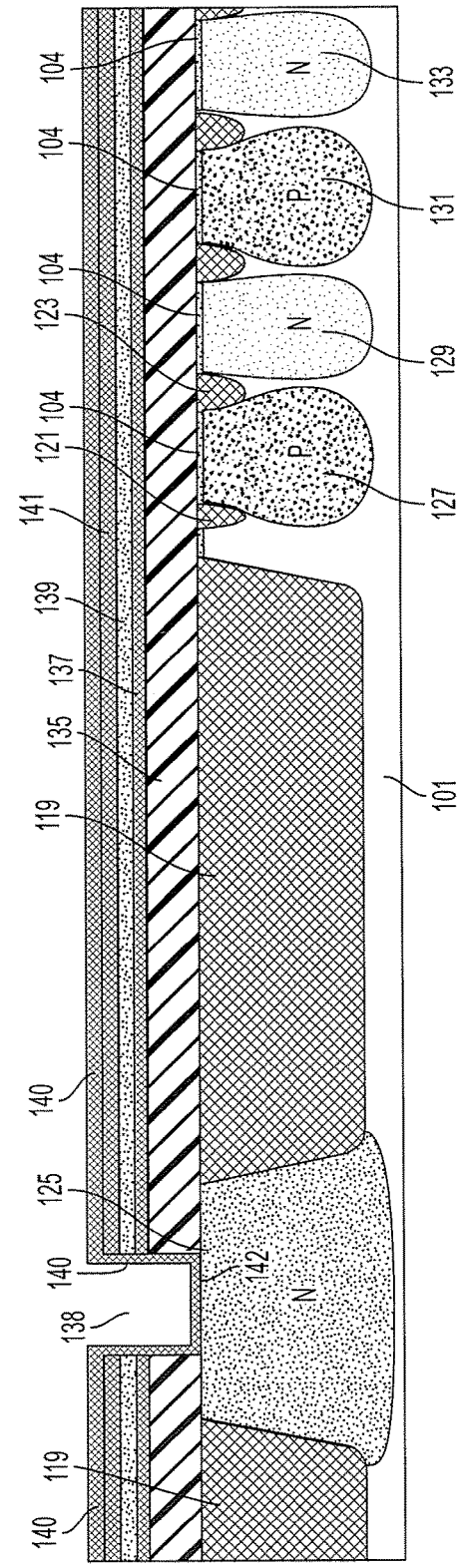
FIG. 11
FIG. 12

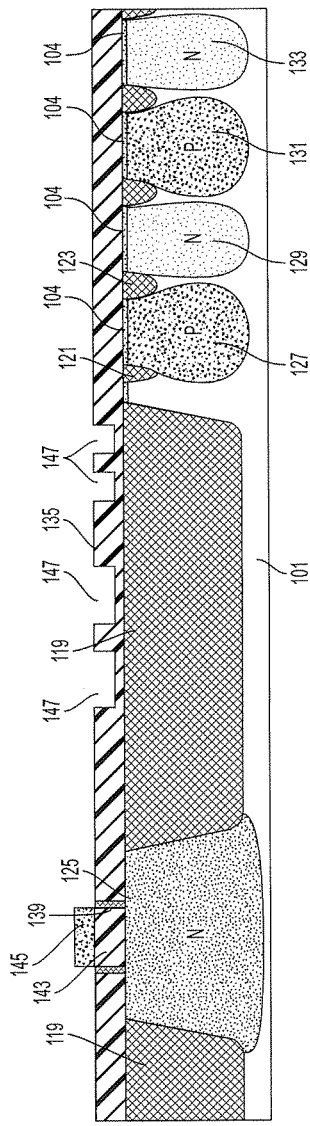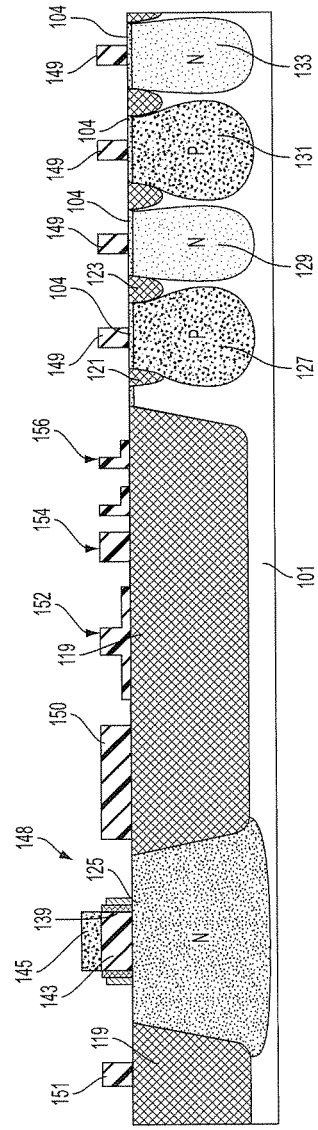

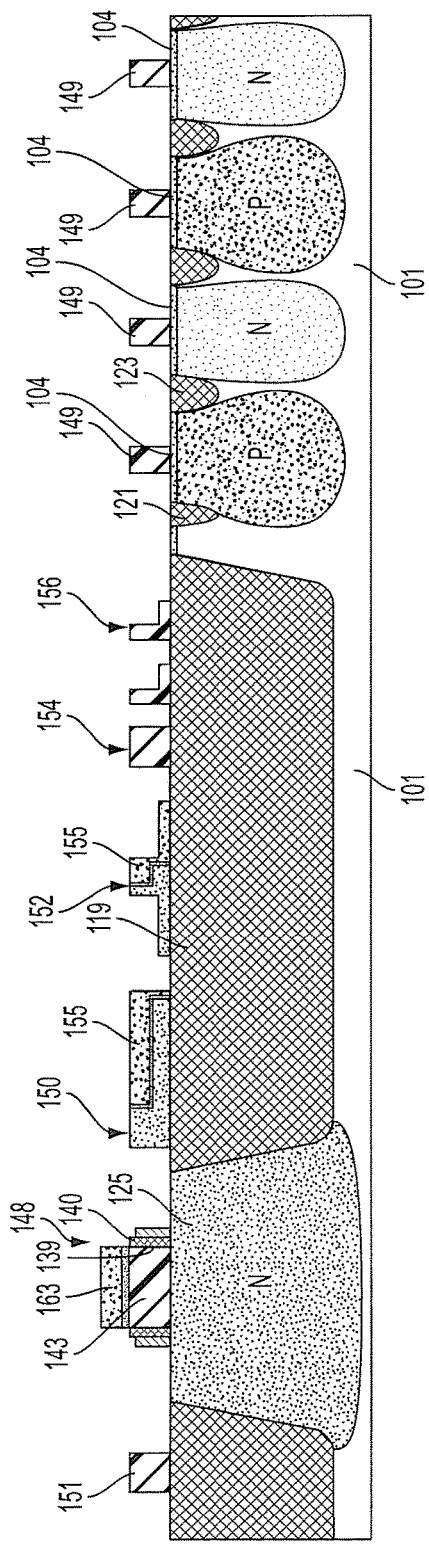
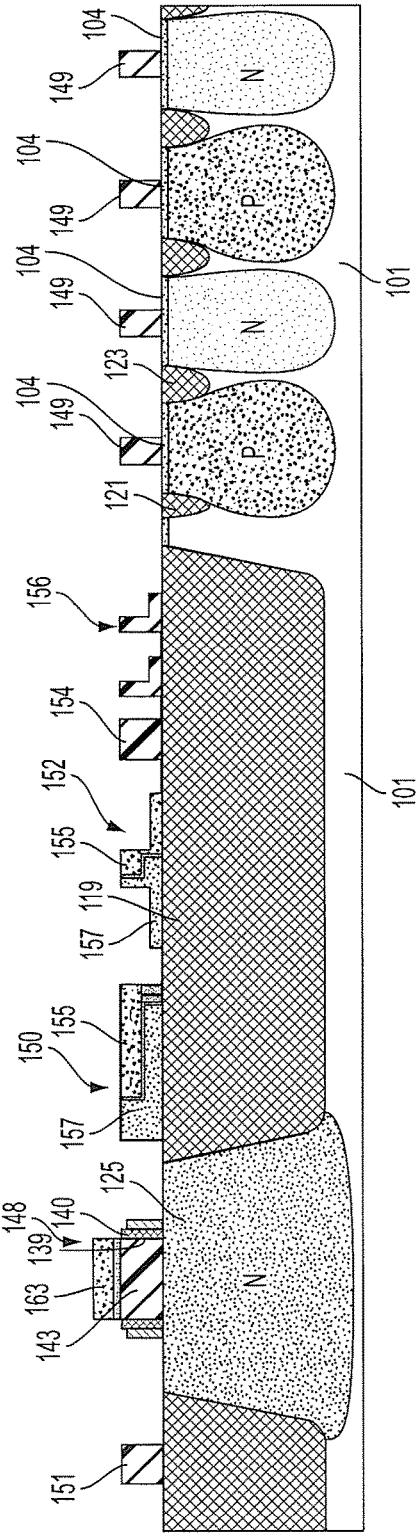
FIG. 19
FIG. 20

METHOD AND STRUCTURE PROVIDING A FRONT-END-OF-LINE AND A BACK-END-OF-LINE COUPLED WAVEGUIDES

GOVERNMENT RIGHTS

This invention was made with Government support under Agreement HR0011-11-9-0009 awarded by DARPA. The Government has certain rights in the invention.

FIELD OF THE INVENTION

Method and structural embodiments described herein relate to coupled integrated photonic structures, such as waveguides, and methods of forming them.

BACKGROUND OF THE INVENTION

One photonic device commonly employed in an optoelectronic integrated circuit is a waveguide which may transmit, modulate, detect and optionally multiplex optical signals. Silicon and/or polycrystalline silicon (polysilicon) materials are well suited as cores for such waveguides for short distance optical signal transmission, modulation, multiplexing and to some extent optical signal detection. However, for transmission over distances longer than 1 cm, other core materials with lower loss optical transport are more desirable. In the case of photonic waveguide integration, polysilicon material at the transistor gate level of an integrated optoelectronic circuit may be used as the waveguide core. To date, a polysilicon waveguide loss of 10 dB/cm has been the lowest achieved loss in the 1.3 µm wavelength ($\lambda$) range, which is often employed for optical communications. Further research may reduce this number to the order of 5 dB/cm. Such a loss value is acceptable for most functions of a photonic waveguide, other than routing the optical signals across a cm-scale chip. For such longer distances, it is desirable to use a lower loss waveguide having a different core material. The material properties and physical location of such a lower loss waveguide generally limits its use for any purpose beyond guiding light in a mostly straight line. Accordingly, a need exists for a waveguide structure which has a lower transmission loss path for longer distances, and which can also provide an easily routed path for guiding light in other than a straight line over shorter distances.

BRIEF DESCRIPTION OF THE DRAWINGS

For a more complete understanding of the present embodiments, reference is now made to the following description taken in conjunction with the accompanying drawings, in which like reference numerals represent like parts:

FIG. 1 illustrates in cross-section a starting structure for the integration of an optoelectronic integrated circuit in accordance with one example embodiment;

FIG. 2 illustrates the FIG. 1 cross-section after subsequent etching;

FIG. 9 illustrates the FIG. 8 cross-section after subsequent dielectric material depositions;

FIG. 10 illustrates the FIG. 9 cross-section after subsequent masking and etching;

FIG. 11 illustrates the FIG. 10 cross-section after subsequent dielectric material deposition;

FIG. 12 illustrates the FIG. 11 cross-section after subsequent opening bottom etching;

FIG. 17 illustrates the FIG. 16 cross-section after subsequent partial etching of polysilicon;

FIG. 18 illustrates the FIG. 17 cross-section after subsequent complete etching of polysilicon;

FIG. 19 illustrates the FIG. 18 cross-section after subsequent photonic device implants;

FIG. 20 illustrates the FIG. 19 cross-section after further subsequent photonic device implants;

DETAILED DESCRIPTION OF THE INVENTION

Figure 3:
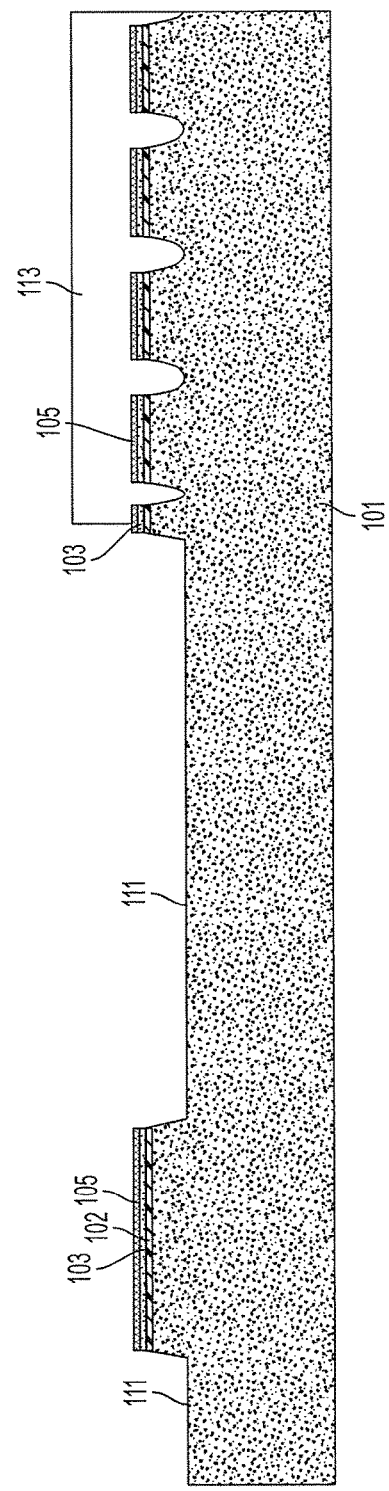
FIG. 3 illustrates the FIG. 2 cross-section after subsequent masking.

Method and structural embodiments provide an integrated optoelectronic structure having optically coupled first and second waveguides. The first waveguide has a higher optical signal transmission loss, but is more easily fabricated with other photonic and electronic devices, and is easily routed within the integrated optoelectronic structure. The second waveguide has a lower optical signal transmission loss, but has less routing flexibility. The second waveguide is most suitable for a longer distance straight line optical transmission path. Optically coupling the two waveguides provides an integrated optoelectronic structure which retains the processing simplicity and flexibility of waveguide routing using the first waveguide, but which can also transmit optical signals over longer distances with less signal loss using the second waveguide.

Method and structural embodiments also provide an integrated optoelectronic structure in which the core of a first waveguide is fabricated during the fabrication of transistor gates and/or other photonic devices during a front-end-of-line (FEOL) integration process. The core of the second waveguide is fabricated after completion of the FEOL integration process and at a back-end-of-line (BEOL) integration process, during which various interlayer dielectric and metallization layers of an integrated optoelectronic structure are fabricated. The second waveguide is positioned over the first waveguide at a location where the waveguides are coupled.

Method and structural embodiments also provide an integrated optoelectronic structure in which the first waveguide terminates at a location where it optically couples to the second waveguide in which case light within the first waveguide is coupled to and further transmits solely within the second waveguide, or vice versa. Alternatively, the first waveguide can extend beyond the coupling location such that light continues through the first and second waveguides past the coupling location, thereby forming a "hybrid" waveguide using both the first and second waveguides. A close proximity of the first and second waveguides of less than several evanescent delay lengths at the coupling location provides a good optical coupling to enable a transition of light between the first and second waveguides, or a partial transition of light between the first and second waveguides enabling use of both waveguides as a hybrid waveguide.

The first waveguide can be formed of materials for the core and cladding which are easily integrated during FEOL processing of an optoelectronic structure and provide for processing and routing ease. Suitable materials include silicon, e.g. polysilicon, as the waveguide core material and an oxide, e.g., silicon dioxide, and/or silicon nitride as a cladding material. One suitable material is silicon nitride. A suitable cladding for the second waveguide may include an oxide, e.g., silicon dioxide, BPSG or PSG. By forming the second waveguide during a back-end-of-line (BEOL) integration processing, it can be fabricated of sufficient size for optical signal transmission at typical optical signal communication wavelengths and with minimal integration complexity.

Examples of method and structural embodiments are described below in the context of one example of an integrated optoelectronic structure. However, the invention is not limited to specific described and illustrated embodiments. It should be understood that many modifications can be made in both in the fabrication processing as well as in the structural implementation described without departing from the spirit and scope of the invention. Accordingly, the description below is to be taken solely as one non-limiting example of fabrication methods and resulting structures, and the invention is only limited by the scope of the appended claims.

FIG. 1 illustrates the cross-section of a starting structure in which a substrate 101, for example a semiconductor substrate such as a silicon substrate, has formed thereon by blanket deposition an oxide material 102, a nitride material 103 over the oxide material 102 and an oxide material 105 over the nitride material 103. The structure illustrated in FIG. 1 represents the result of the beginning of a front-end-of-line (FEOL) processing. The oxide materials 102 and 105 may be for example, silicon dioxide, and the nitride material 103 can be, for example, silicon nitride. A patterned photoresist material 107, having openings 102a, 102b, 102c, 102d is formed over the oxide material 105. It should be understood that only an upper 110 region of substrate 101 is shown and that the substrate may further extend below the upper region 110.

As shown in FIG. 2, the oxide material 102, nitride material 103, and oxide material 105 and portions of the substrate 101 are etched through the openings 102a, 102b, 102c, 102d, and 102e in the photoresist 107 to produce narrower 109a and wider 109b shallow trenches and a still wider trenches 111. The wider trenches 11 will subsequently be further etched. FIG. 2 also illustrates the removal of the photoresist material 107.

Figure 4:
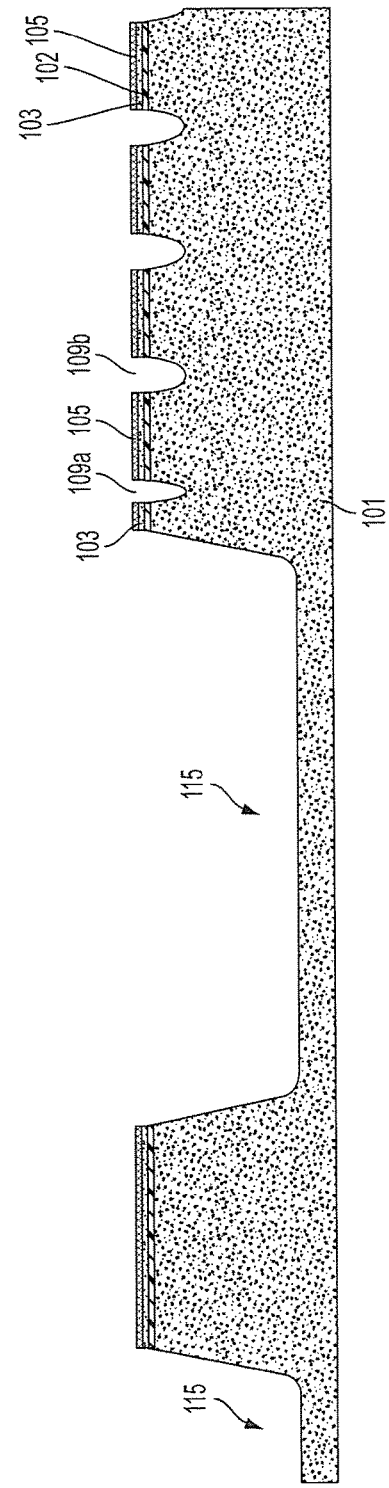
FIG. 4 illustrates the FIG. 3 cross-section after subsequent etching.

FIG. 3 illustrates a patterned photoresist material 113 applied over trench areas 109a, 109b of the FIG. 2 structure to protect these trenches from further etching, while FIG. 4 illustrates a further etching of the trenches 111 to produce deeper trenches 115 as the oxide 102, 105 and nitride 103 materials also act as an etch mask. FIG. 4 also shows removal of the photoresist material 113.

Figure 5:
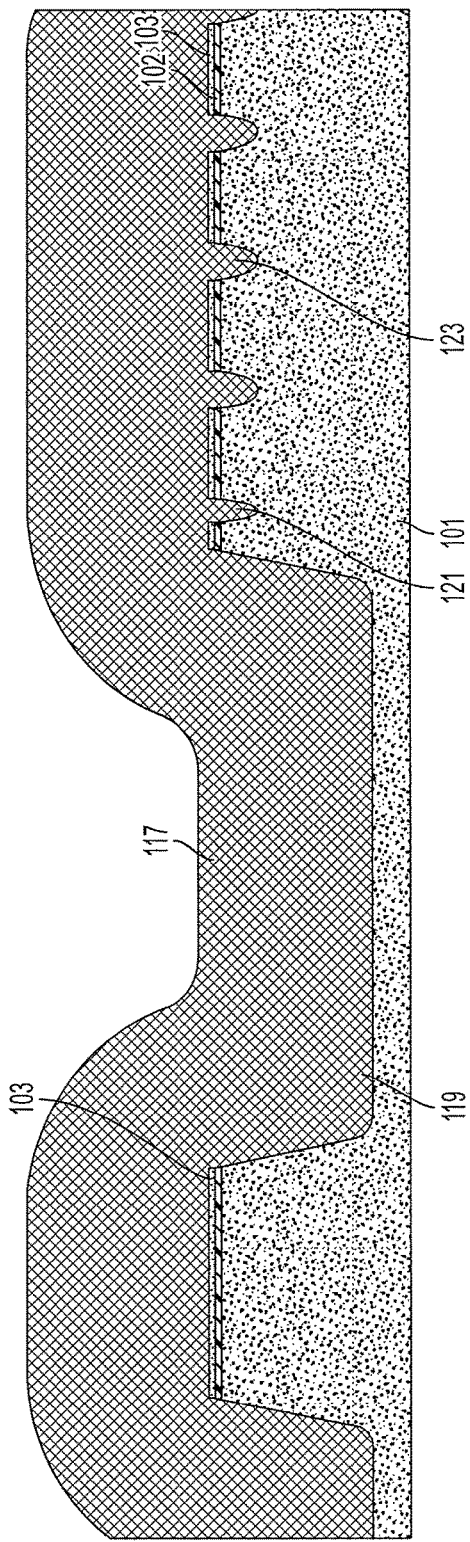
FIG. 5 illustrates the FIG. 4 cross-section after subsequent dielectric deposition.
Figure 6:
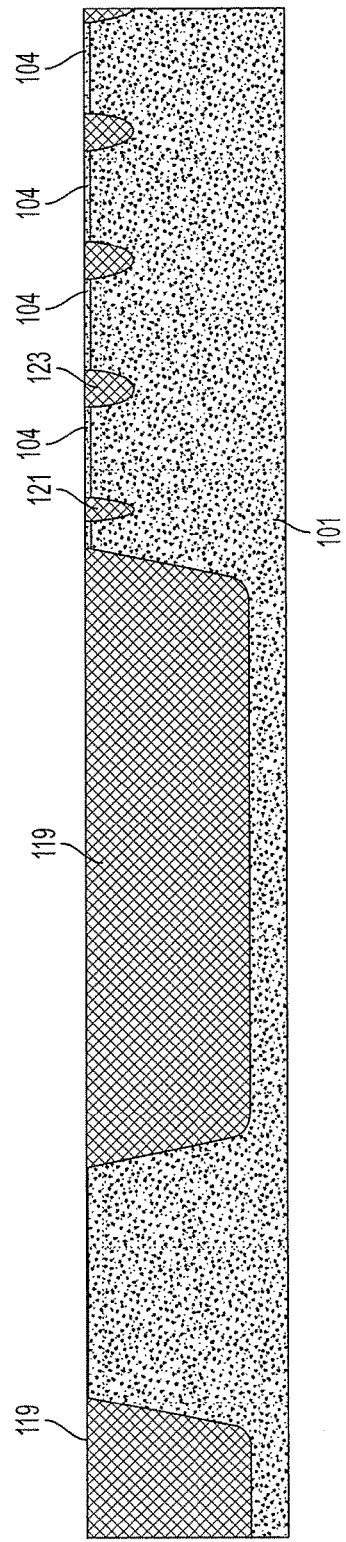
FIG. 6 illustrates the FIG. 5 cross-section after subsequent planarization and gate oxide formation.

FIG. 5 illustrates the subsequent blanket formation of an oxide material 117, e.g., silicon dioxide, which fills both the deep trenches 115 and shallow trenches 109a, 109b and merges with the oxide material 105 which it covers to form a deep filled trenches 119 and shallow filled trenches 121 and 123. It is noted that the shallow filled trenches 121 and 123 will be used for electrical isolation of later fabricated transistor structures. The narrower filled trenches 121 can be used to isolate subsequently fabricated smaller-sized transistors while the wider filled trenches 123 can be used to isolate subsequently fabricated larger-sized transistors. The deeper filled trenches 119 will be used to optically isolate photonic structures fabricated thereover from the underlying substrate 101. FIG. 6 illustrates a planarization, e.g., CMP planarization, of the FIG. 5 structure to the level of the upper surface of substrate 101 and the subsequent selective growth of gate oxide material 104 on the substrate 101 which will provide the gate oxide for subsequently fabricated transistors. Although FIG. 6 shows all gate oxide material of the same depth, the grown gate oxide 104 can be of different depths depending on the desired electrical characteristics of subsequently formed transistors. The gate oxide material 104 could alternatively be selectively deposited rather than being grown.

Figure 7:
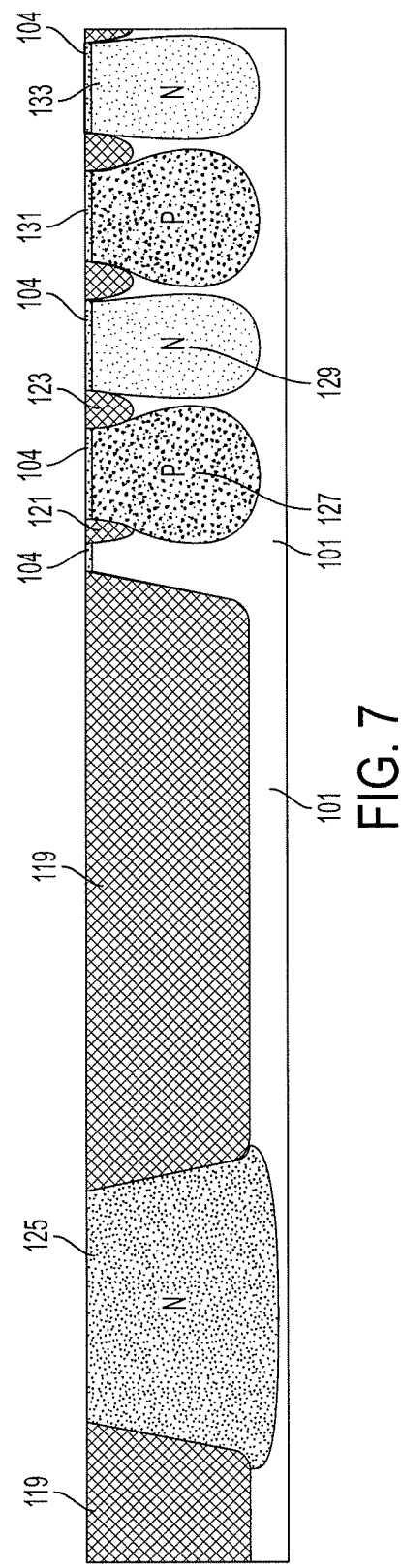
FIG. 7 illustrates the FIG. 6 cross-section after subsequent well implants.

FIG. 7 illustrates the subsequent formation of different implanted doped wells within the substrate 101 between the deep isolation trenches 119 and shallow isolation trenches 121 and 123. Numeral 125 illustrates an N-doped region for use in subsequent formation of an optical detector, region 127 a P-doped well, region 129 an N-doped well, region 131 a P-doped well, and region 133 an N-doped well. The wells 127, 129, 131, 133 define wells for subsequently formed transistors. The doping is by implanting appropriate dopants and subsequent dopant diffusion by heating. The dopant conductivity and concentration will depend on the type of transistors and their desired characteristics which are later formed in or over the doped regions, as described below. Likewise, the doping of well 125 will depend on desired characteristics of an optical detector. Accordingly, the illustrated doping can be tailored to the specific photonic and electrical devices, e.g., photonic detectors and transistors, desired to be formed.

Figure 8:
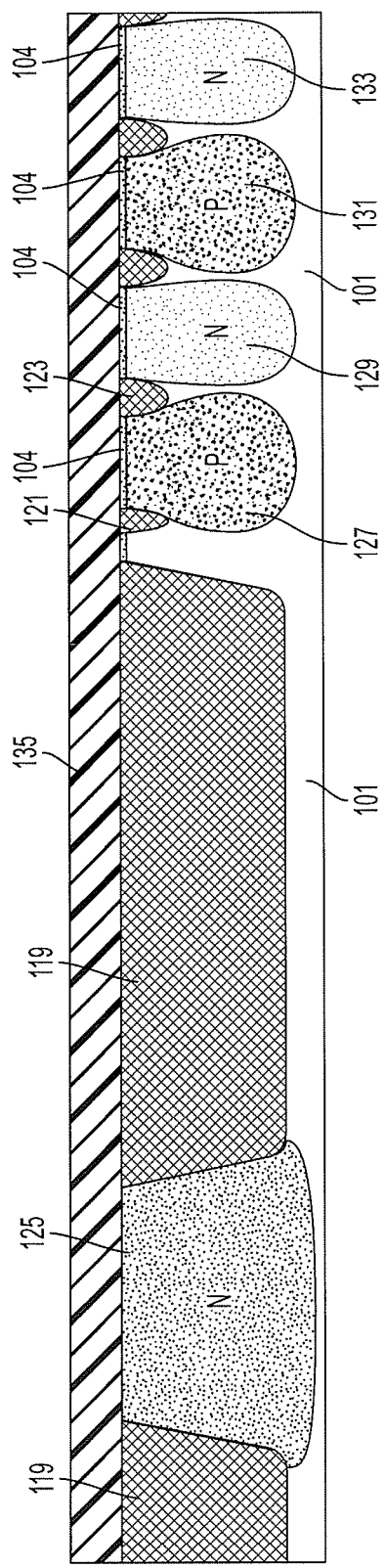
FIG. 8 illustrates the FIG. 7 cross-section after subsequent polysilicon deposition.

FIG. 8 illustrates a blanket deposition of polysilicon material 135 over the FIG. 7 structure. Following deposition of the polysilicon material 135, and as shown in FIG. 9, additional materials are subsequently blanket deposited over the polysilicon material 135 in sequence. These include an oxide material 137, for example, silicon dioxide, a nitride material 139, for example, silicon nitride, and another oxide material 141, for example, silicon dioxide.

FIG. 10 illustrates the result of a photoresist masking and etching to form a window opening 138 in the polysilicon material 135, oxide material 137, nitride material 139, and oxide material 141. The window opening 138 extends to the level of the substrate 101 having the implanted N well 125. As shown in FIG. 11, an oxide material 140 is next formed within the opening 138 and over the oxide material 141. FIG. 12 illustrates the subsequent etch removal of the bottom part of the oxide spacer 140 within opening 138, once again exposing the top surface 142 of the N well 125.

Figure 13:
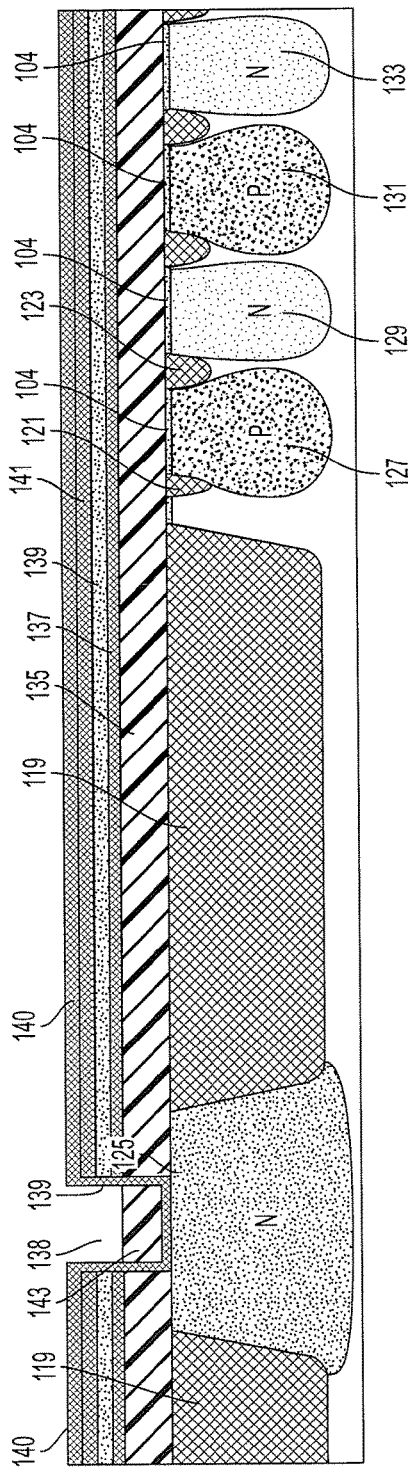
FIG. 13 illustrates the FIG. 12 cross-section after subsequent epitaxial growth.
Figure 14:
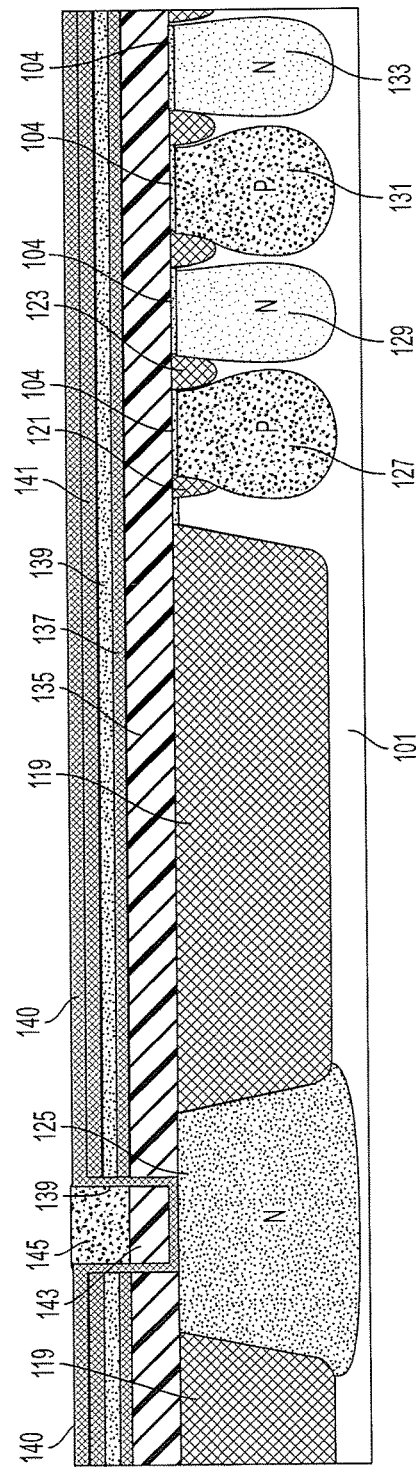
FIG. 14 illustrates the FIG. 13 cross-section after subsequent polysilicon deposition.
Figure 15:
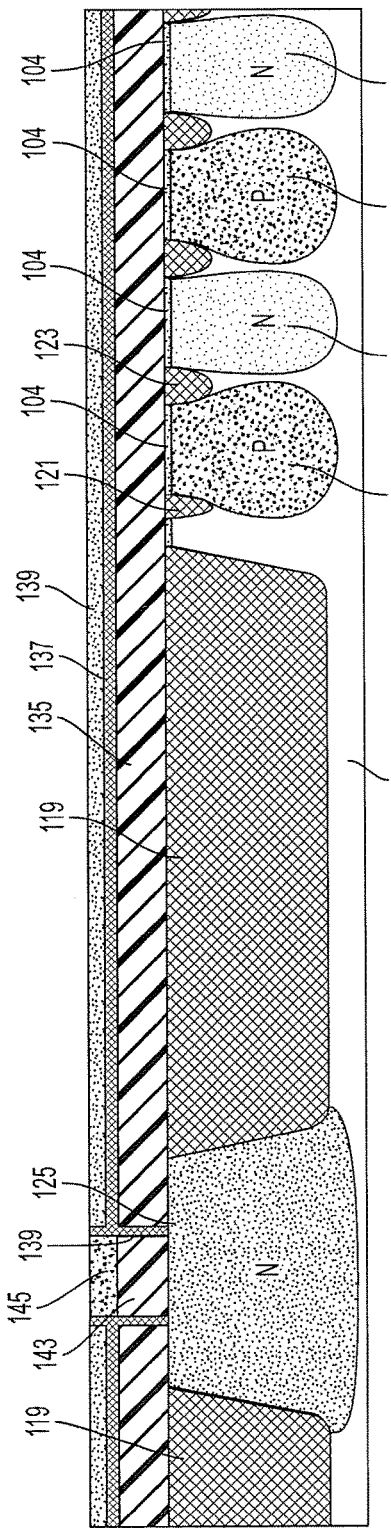
FIG. 15 illustrates the FIG. 14 cross-section after subsequent planarization.

FIG. 13 illustrates the subsequent epitaxial growth of an intrinsic silicon germanium material 143 within the opening 137. The intrinsic silicon germanium material 143 may be unstrained, partially strained or fully strained and will act as part of a photonics detector in the completed structure. FIG. 14 illustrates formation of a p-doped polysilicon capping material 145 over the strained silicon germanium material 143 within the remainder of the opening 138. The p-doped polysilicon capping material 145 is subsequently planarized as shown in FIG. 15. The planarization can be a CMP planarization which stops on the nitride material 139 and which also removes the oxide materials 140, 141.

Figure 16:
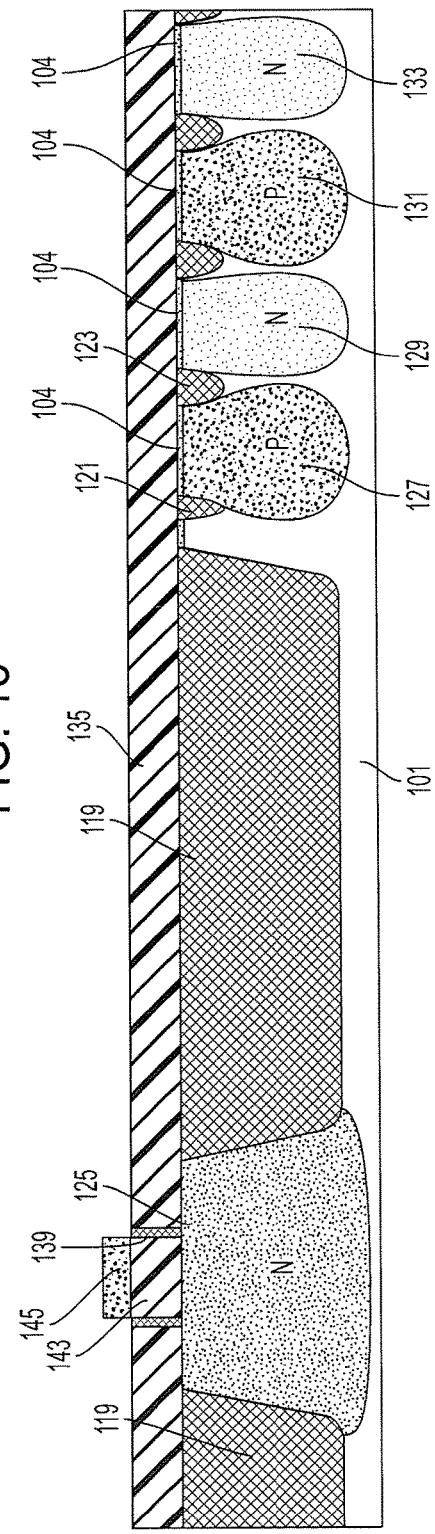
FIG. 16 illustrates the FIG. 15 cross-section after subsequent dielectric material etching.

FIG. 16 illustrates the result of a masking and etching to remove the nitride material 139 and oxide material 137. This etch exposes the upper surface of the polysilicon material 135. As shown in FIG. 16, the planarized p-doped silicon capping layer 145 remains in place.

FIG. 17 illustrates the result of a masking and partial etch through the polysilicon material 135 forming recesses 147 therein which will be used for formation of various photonic devices, as described below.

Subsequent to the partial polysilicon material 135 etching illustrated in FIG. 17, and as shown in FIG. 18, a subsequent masking and full etch of the polysilicon material 135 is performed. This etch leaves a polysilicon material element 151 which will be used as the core for a polysilicon waveguide, a silicon germanium detector 148, a polysilicon material element 150 to be used to form vertical junction slab modulator, an inverted t-shaped polysilicon material element 152 which will be used to form a lateral junction width modulator, a material element 154 to be used as the core of another polysilicon waveguide, and a plurality of L-shaped polysilicon material elements 156 to be used as vertical coupler grating teeth. FIG. 18 also illustrates various polysilicon material elements 149 which will be used as transistor gates during subsequent fabrication. It should be noted that the polysilicon material elements 150, 151, 152, 154 and 156 are all formed over a photonics isolation trench 119 which is filled with an oxide for decoupling optical signals from substrate 101. In addition, all polysilicon material elements for use as fabrication of photonic devices and those for use in fabricating transistor gates are formed at the same time from the common polysilicon material 135 (FIG. 8). It should be noted, however, that the polysilicon material used for the gates of the transistors may also be a different polysilicon material from that used in fabricating the photonic devices. The elements 151 and 154 which form waveguide cores extend in a direction into and out of the plane of the FIG. 18 drawing.

Figure 18A:
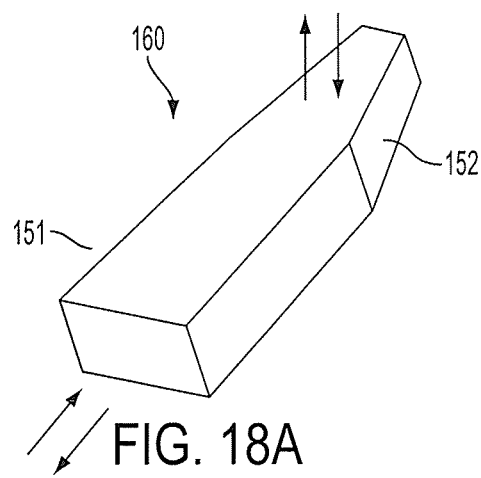
FIGS. 18A, 18B, and 18C respectively illustrate, in perspective view, different structural embodiments of a waveguide coupling area fabricated as shown in FIG. 18.
Figure 18B:
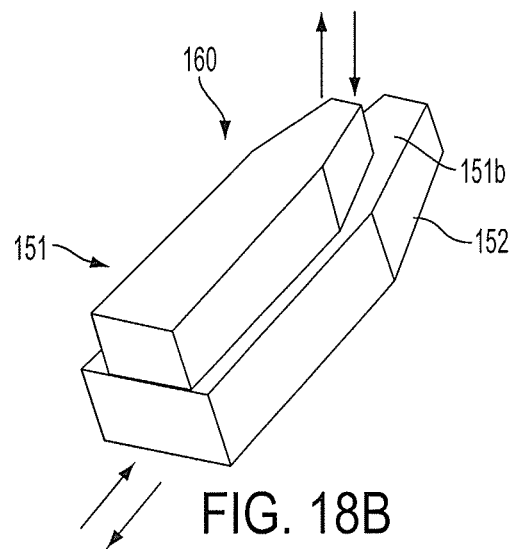
Figure 18C:
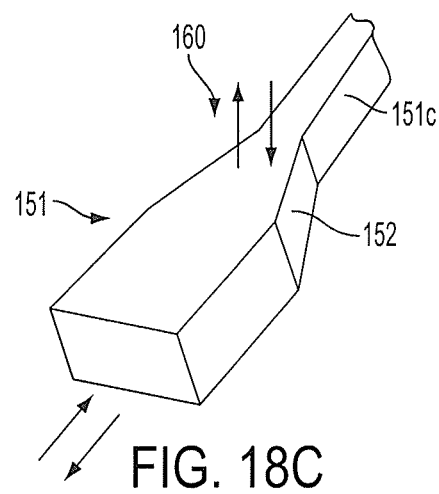

As also shown in FIG. 18, the waveguide cores 151 and 154 are formed at the transistor gate formation level as part of a front-end-of-line (FEOL) of the integration process. In this example embodiment, the polysilicon material element 151 will be used as a waveguide core for a lower level waveguide which will be optically coupled to an upper level high index waveguide. In order to accommodate the evanescent coupling between these two waveguides, the polysilicon material element 151 can be etched into different shaped width-wise narrowing coupling areas, respectfully illustrated in FIGS. 18A, 18B, and 18C.

FIG. 18A illustrates polysilicon material element 151 formed with side edge tapers 152 at one terminating end which will be used for coupling to a subsequently fabricated upper level waveguide. The arrows indicate the bi-directional light passage 152, through the coupling area 160 of the waveguide core 151. FIG. 18B illustrates a terraced structure 151b for the polysilicon material element 151 which can be used for coupling to a subsequently fabricated upper level waveguide. The upper element 151b taper terminates before the lower element 152 taper to facilitate light coupling. FIG. 18C illustrates another variant for the polysilicon material elements 151 in which a side edge taper 152 is formed in the material element 151 and which also has an extension 151c representing a continuation of the waveguide core 151. This extension 151c will be used to form a continuing portion of a waveguide while also allowing, by virtue of the taper 152, a coupling of part of the light energy within the polysilicon material element 151 to/from an upper level waveguide as described below. The extension 151c can also be used with the terraced waveguide core shown in FIG. 18B.

Figure 21:
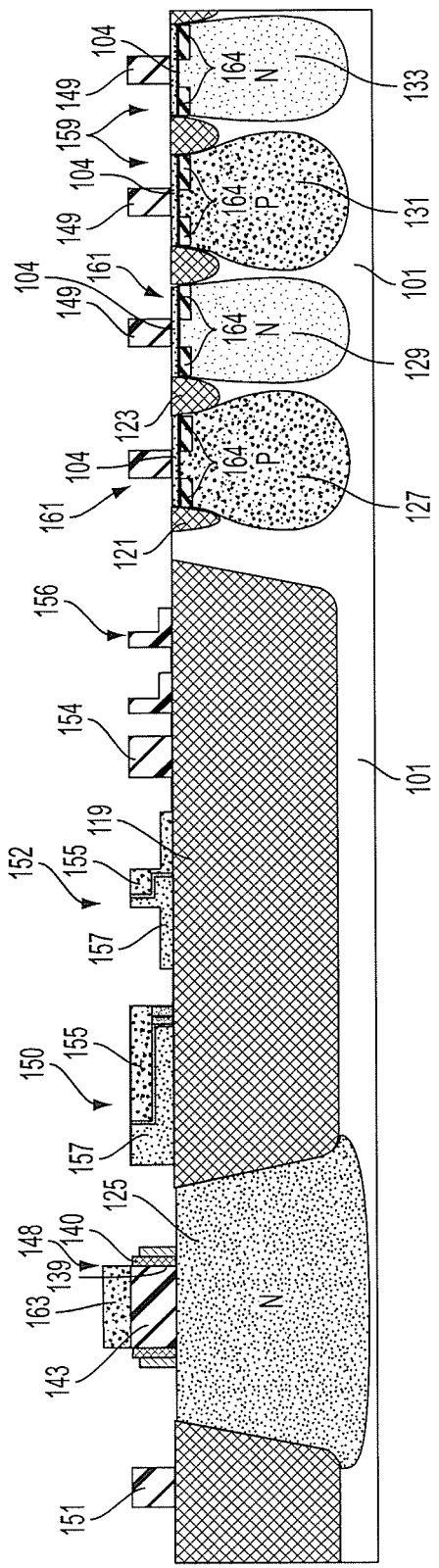
FIG. 21 illustrates the FIG. 20 cross-section after subsequent transistor implants.

FIG. 19 shows p-type dopant implants 155 provided for a portion of each of the polysilicon material elements 150 and 152 which forms a top half of a vertical junction of a photonic device formed from the polysilicon material 150 and 152. Following this, and as shown in FIG. 20, an n-type dopant implant 157 is used for the bottom half of the vertical junction for the polysilicon material elements 150 and 152. As shown in FIG. 21, halo dopant implants 164 are provided for associated polysilicon material gate elements 149 which will form CMOS transistors. The dopant implants will differ for different ones of the to be formed transistors depending on the varied functions of the transistors for a CMOS circuit.

Figure 22:
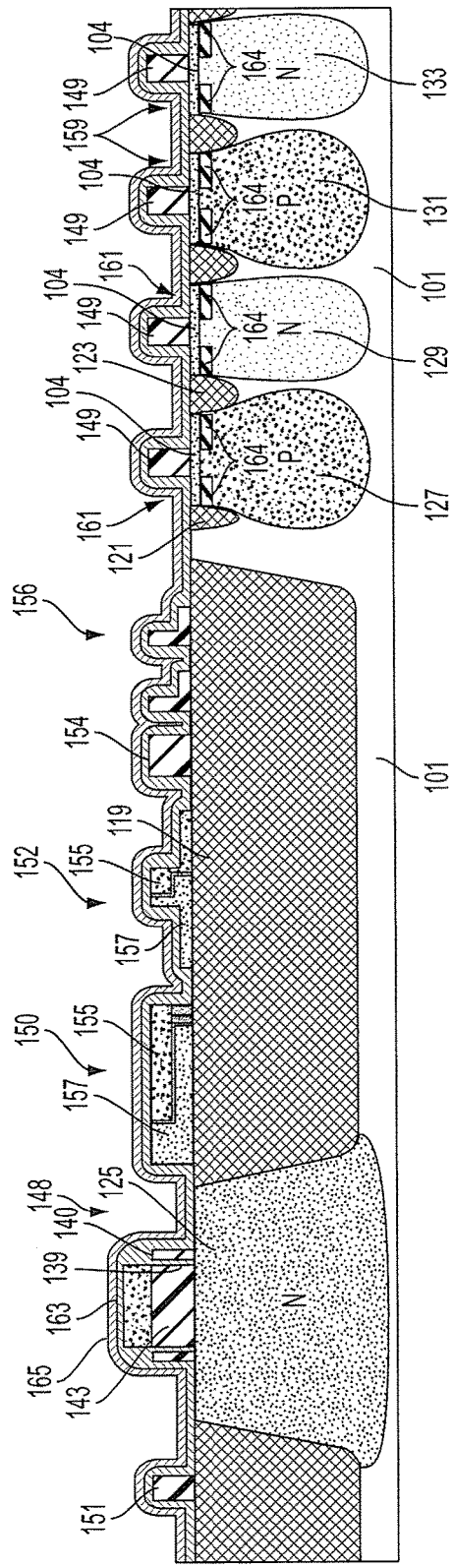
FIG. 22 illustrates the FIG. 21 cross-section after subsequent dielectric depositions.

Following the transistor dopant implants, and as shown in FIG. 22, a blanket layer of a thinner oxide material 163, e.g., silicon dioxide, followed by a blanket layer of thicker nitride material 165, e.g., silicon nitride, are formed over the entire structure.

Figure 23:
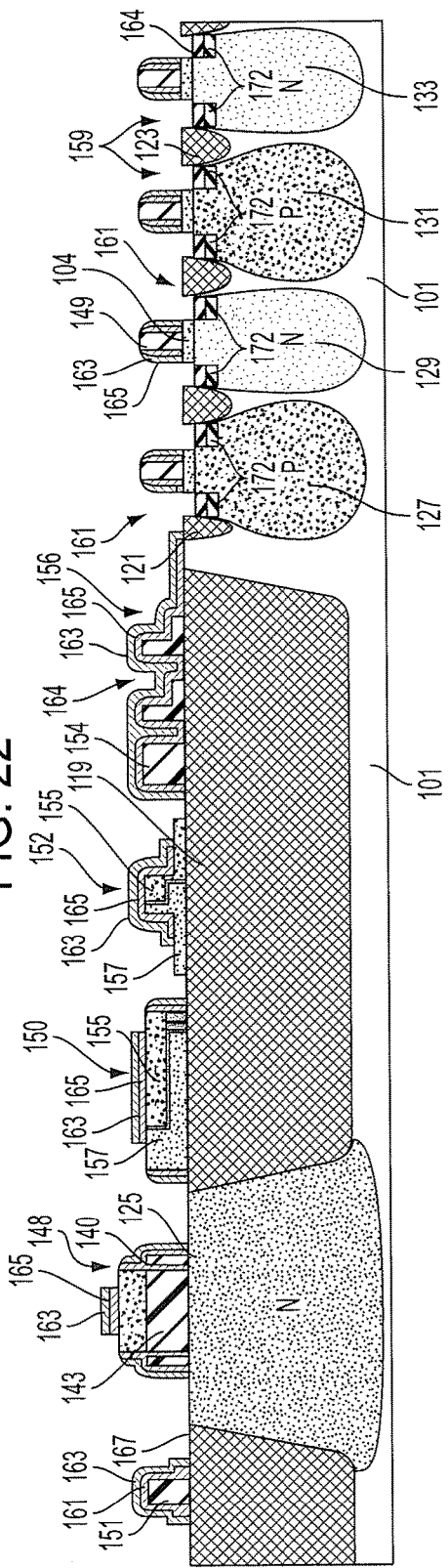
FIG. 23 illustrates the FIG. 22 cross-section after subsequent etching.

Subsequently, as shown in FIG. 23, the oxide material 163 and nitride material 165 are masked and vertically etched to provide nitride sidewall spacers on the sides of each of the polysilicon material elements 150, 151, 152, 154, 156, photonic detector 148, and transistor gates 149. Portions of the oxide material 163 and nitride material 165 also remain partially over the top surfaces of polysilicon material elements 150, 152, and photonic detector 148, leaving other areas of polysilicon or the substrate surfaces exposed for a silicide process. Portions of the oxide material 163 and nitride material 165 also remain completely over polysilicon elements 151, 154 and 156. The oxide 104, 163 and nitride 165 on opposite sides of gates 149 removed by this etch expose the upper surface of the substrate at these locations. The upper surfaces of gates 149 are also exposed. Subsequently, source/drain regions 172 are formed by dopant implants on opposite sides of gates 149. The dopants are also heat activated.

Figure 24:
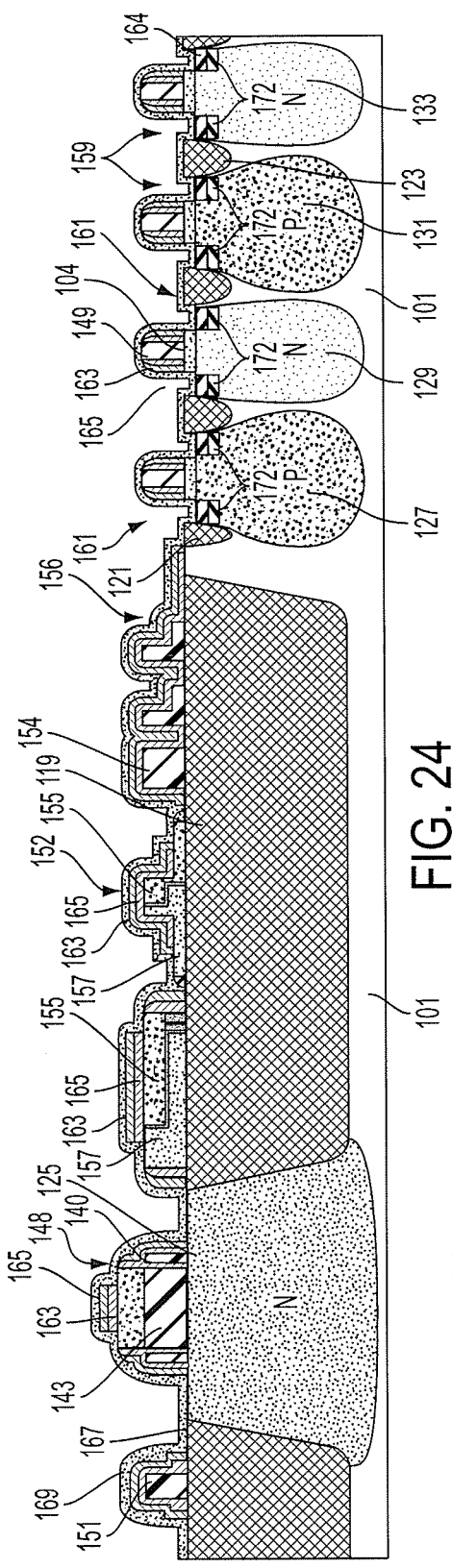
FIG. 24 illustrates the FIG. 23 cross-section after subsequent metal deposition.
Figure 25:
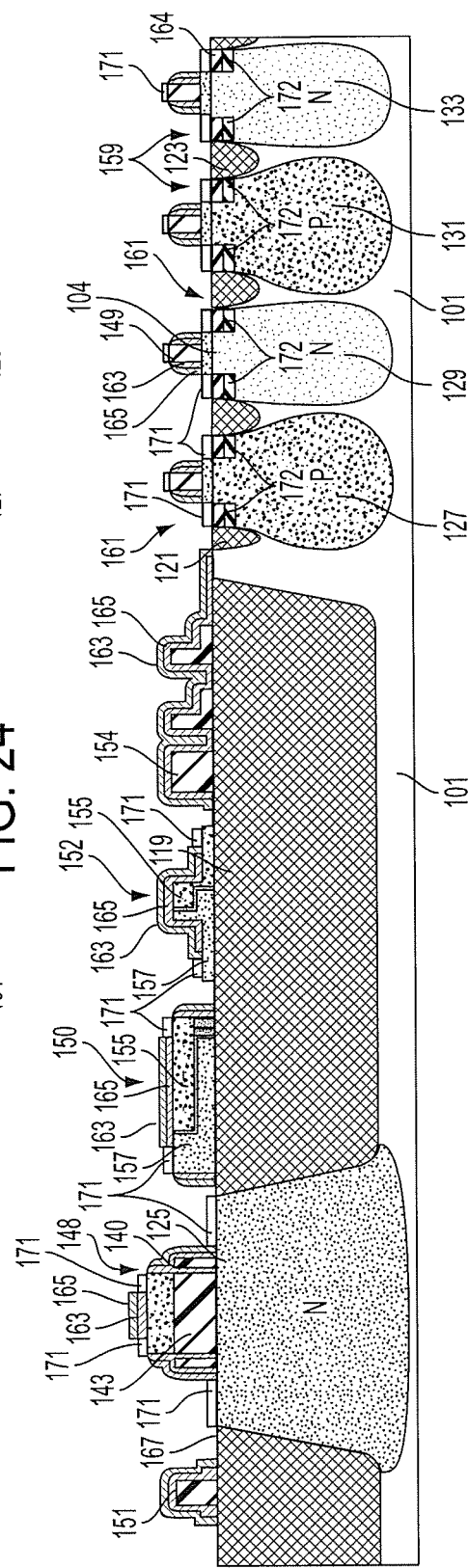
FIG. 25 illustrates the FIG. 24 cross-section after subsequent annealing and etching steps.
Figure 26:
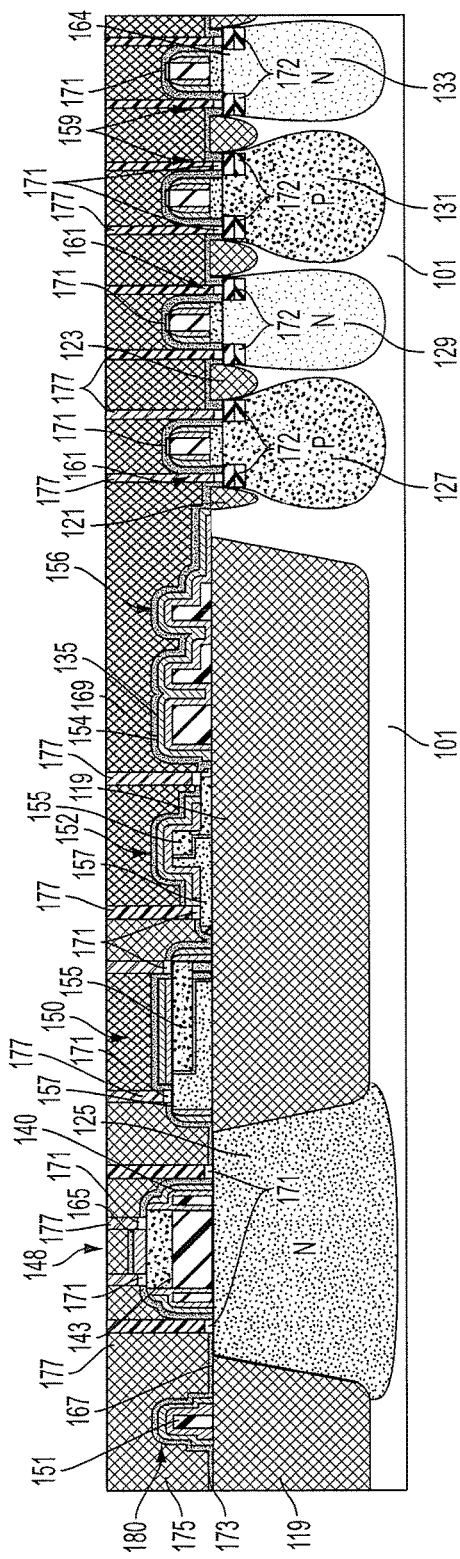
FIG. 26 illustrates the FIG. 25 cross-section after subsequent dielectric deposition, via formation and metallization steps.

Next, as shown in FIG. 24, a uniform deposition of a metal material 169 which can form a silicide, for example cobalt, is applied as a blanket deposition. Other known silicide forming metal materials can also be used. Subsequently, as shown in FIG. 25, the illustrated structure is heated and the silicide forming metal material 169 which touches the surface of polysilicon material and the silicon substrate forms a silicide 171, e.g., cobalt silicide. The FIG. 24 structure is then chemically etched to remove unreacted metal forming material 169. The silicide 171 is illustrated for each of the transistor structures on the top of the gates 149 and over areas of source/drain regions 172 on sides of the gates 149, as well as on the upper surface of the polysilicon material forming contacts to the silicon germanium detector 148, vertical junction slab modulator 150 and lateral junction grid modulator 152. After the removal of the unreacted metal, e.g., cobalt, and as shown in FIG. 26, the entire structure is covered with a nitride material 173, e.g., silicon nitride, by blanket deposition. At this point all front-end-of-line (FEOL) processing is complete.

Following deposition of nitride material 173, and as also shown in FIG. 26, there is a blanket deposition of an oxide material 175, e.g., BPSG, PSG or silicon dioxide. This blanket deposition is the first step in a back-end-of-line (BEOL) integration process. In addition, as shown in FIG. 26, conductive vias 177 are formed in the oxide material 173 by etching vias and filling them with a conductive material, e.g., doped polysilicon, to provide electrical contact to the silicide areas 171 of the various illustrated photonic and transistor structures. The conductive vias 177 are then planarized to the upper surface of oxide material 175, as also shown in FIG. 26.

Figure 27:
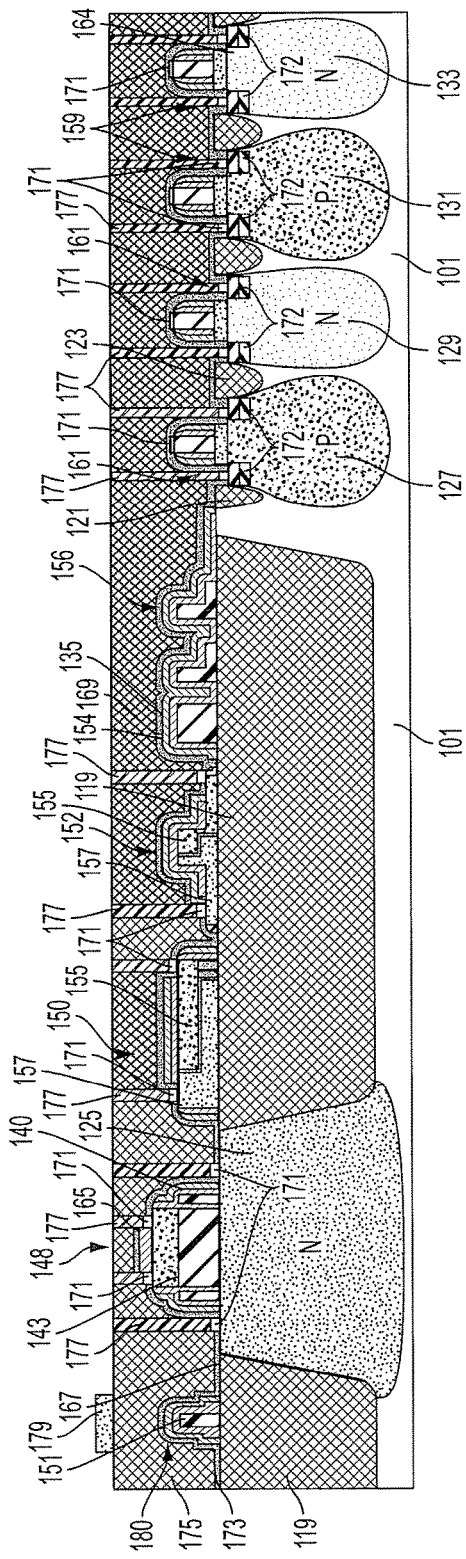
FIG. 27 illustrates the FIG. 26 cross-section after subsequent dielectric deposition and etching steps.

FIG. 27 illustrates the deposition and subsequent etching of a nitride material, e.g., silicon nitride, into a waveguide core 179 for an upper level high index waveguide. As shown in FIG. 27, the nitride material 179 is formed on the oxide material 175 and in an area which is over the previously formed polysilicon waveguide 180. Since it is desired to couple the lower waveguide 180 to an upper waveguide formed from nitride core 179, the nitride core 179 where it overlies lower waveguide 180 may be formed with a coupling end which overlies the coupling end of the core 151 of waveguide 180, in the manner illustrated in the embodiments shown in FIGS. 27A, 27B, and 27C.

Figure 27A:
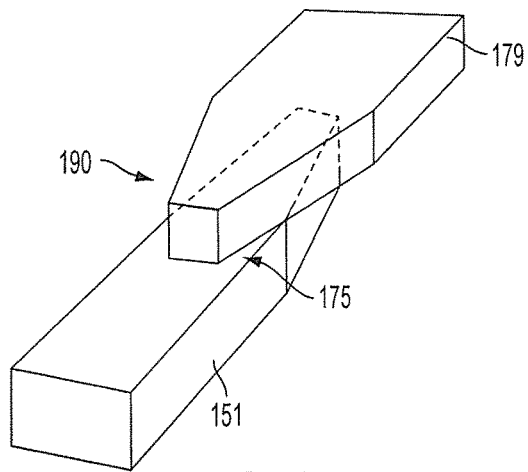
FIGS. 27A, 27B, and 27C respectively illustrate, in perspective view, different structural embodiments of a waveguide coupling area fabricated as shown in FIG. 27.
Figure 27B:
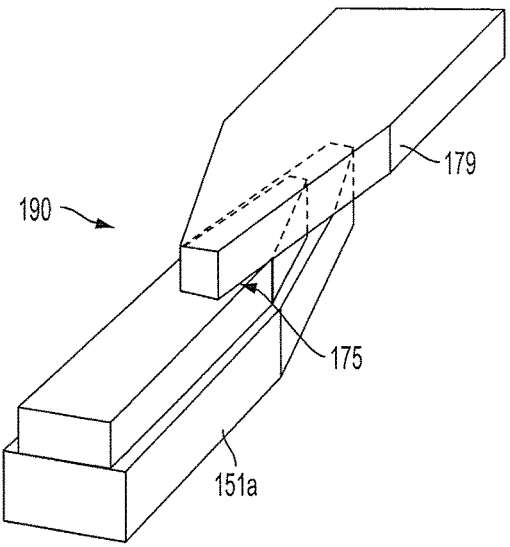
Figure 27C:
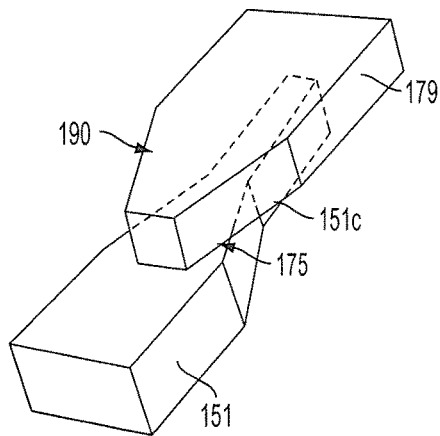

FIGS. 27A, 27B, and 27C illustrate respective embodiments of a coupling between nitride core 179 and the core 151 of the lower waveguide 180. Referring first to FIG. 27A, the nitride material 179 can be formed wider than the lower waveguide core 151 and with a width-wise tapered end which overlaps the width-wise tapered end of the polysilicon material 151 forming the core of waveguide 180. The oxide material 175 resides between the lower waveguide 180 having core 151 and the upper waveguide core 179. For ease of understanding the coupling, the oxide material 163, nitride 165 and nitride 173 over core 151 are not illustrated in FIGS. 27A, 27B and 27C. In FIG. 27A, the tapers in the two waveguide cores 151 and 179 overlap one another. FIG. 27B, shows the terraced polysilicon waveguide core 151a with an overlapping tapered end for the wider waveguide core 179. FIG. 27C illustrates the waveguide core 151 as having a tapered end and a further extending portion 151. FIG. 27C further shows the tapered wider waveguide core 179 overlapping the taper in the waveguide core 151c. It should be appreciated that in the arrangement illustrated in FIGS. 27A and 27B, all of the light transmitted between the waveguide core 151, the waveguide core 179 is coupled from one waveguide core to the other such that a complete transition of light from a waveguide having a relatively high loss to a waveguide having a relatively low loss, or vice versa, occurs. FIG. 27C, illustrates an embodiment in which both waveguide 180 and a waveguide having the nitride core 179 are used to propogate light in a hybrid fashion as the waveguide core 151 continues past the area of the tapered overlap with the waveguide core 179.

Figure 28:
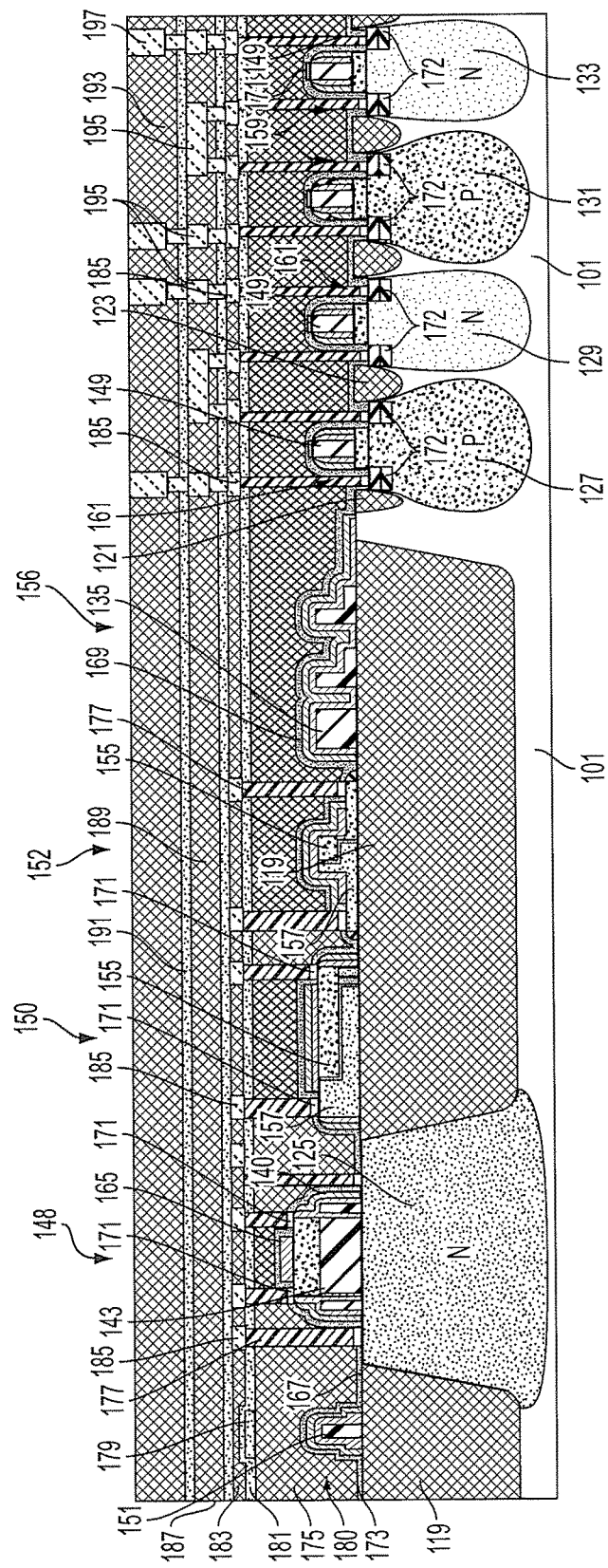
FIG. 28 illustrates the FIG. 27 cross-section after subsequent interlayer dielectric and metallization steps.
Figure 29B:
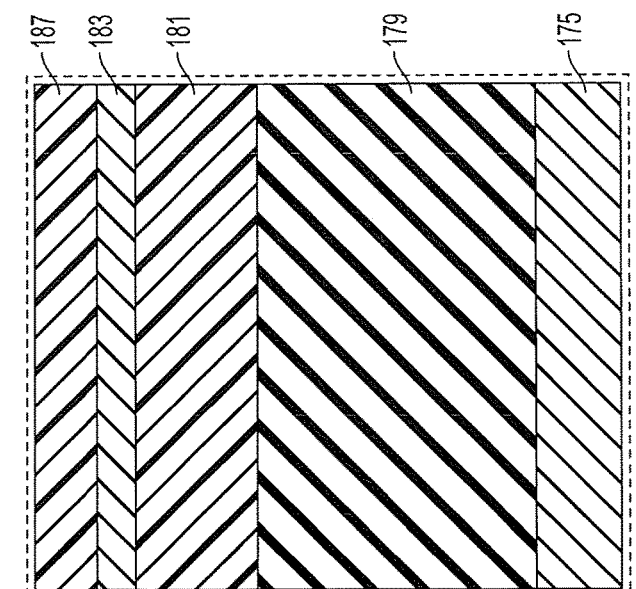
FIGS. 29A and 29B illustrate a blow-out cross-section of a portion of the FIG. 28 structure.
Figure 29A:
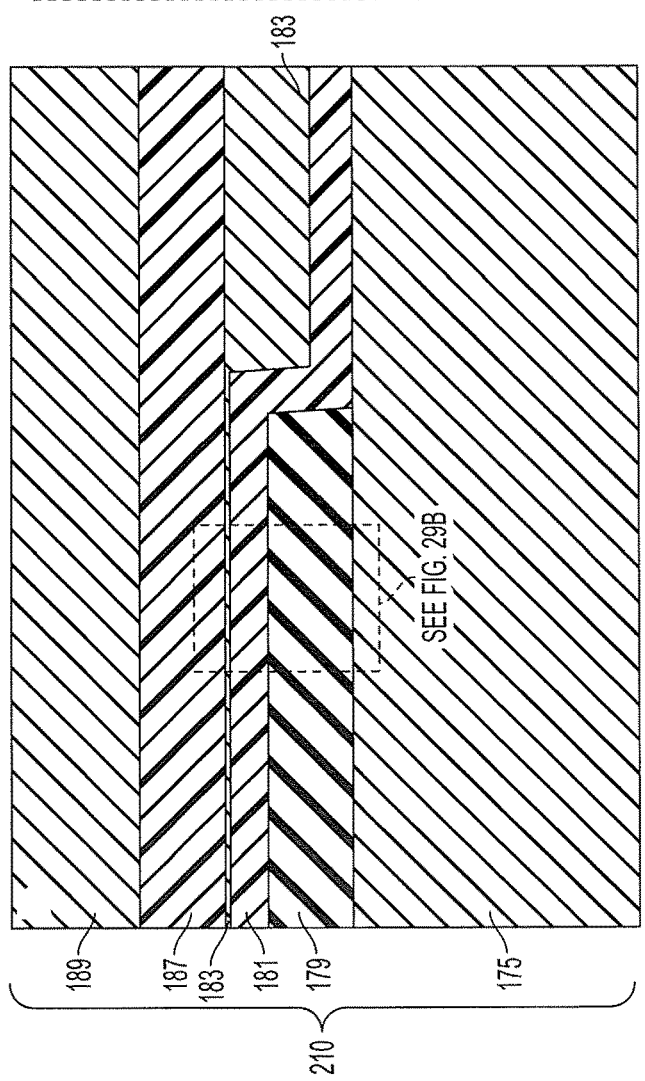

FIG. 28 illustrates the final stages of fabrication of the optoelectronic structure. The integrated optoelectronic structure includes photonic structures 180, 148, 150, 152, 154, 156 formed on the left side of FIG. 28, and integrated CMOS transistor circuits having the gates 149 formed on the right side of FIG. 28. Fabrication of the FIG. 28 structure follows formation of the nitride material core 179. A thin nitride material 181, e.g., silicon nitride, is first deposited over the nitride core 179 and upper surface of oxide material 175. Following this, an oxide material 183, e.g., silicon dioxide, is deposited over the thin nitride material 181. This layer is then planarized to leave a thin oxide material 183 over the nitride material 181 which is, in turn, over the nitride material core 179. FIGS. 29A, 29B show an enlarged portion of the FIG. 28 structure around the nitride core material 179. Conductive vias 185 are formed in the oxide material 183 and nitride material 181. The conductive vias 185 are formed both on the photonics side of the illustrated structure as well as on the transistor circuit side, and connect with the conductive vias 177 formed through the oxide material 175. These vias can be filled with a doped polysilicon or a metal. Following formation of the conductive vias 185 a nitride material 187, e.g., silicon nitride, is blanket deposited followed by the blanket deposition of an oxide material 189, e.g., silicon dioxide. Vias 195 are etched and filled with conductive material e.g., doped polysilicon or metal and electrically connect with the conductive vias 185 on the CMOS transistor side of the structure. A further nitride material 191, e.g., silicon nitride and a further oxide material 193, e.g., silicon dioxide are next blanket deposited. In addition, respective metallization areas 195 and 197 are respectively formed in the oxide materials 189 and 193. As should be apparent to one skilled in the art, the nitride material 181, oxide material 183, nitride material 187, oxide material 189, nitride material 191 and oxide material 193, conductive vias 185, 195 and metallization areas 195, 197 are all part of an BEOL interlayer dielectric and metallization structure, which employs dielectric layers and associated metallization to interconnect the various photonic and electrical devices formed during FEOL integration.

As noted, FIGS. 29A and 29B illustrate in blow-out fashion a portion of the what has now been formed as a high index waveguide 210, employing the nitride material core 179. The upper level high index waveguide 210 is formed by the underlying oxide 175, the nitride waveguide core 179, the nitride material 181, the oxide material 183, nitride material 187 and oxide material 189. This upper level waveguide 210, formed during BEOL integration processing, is formed over the lower level waveguide 180 and the two are optically coupled in the manner illustrated in the coupling embodiments shown in FIGS. 27A, 27B and 27C.

The structures illustrated in FIGS. 28, 29A, 29B provide an optoelectronic circuit structure in which the polysilicon waveguide 180 is fabricated at the front-end-of-line (FEOL) processing with a nitride waveguide 190 provided during a back-end-of-line (BEOL) processing, after formation of the transistors and other structures of the photonics circuits during the FEOL processing.

The polysilicon waveguide 180 and silicon nitride waveguide 190 can be operated in a manner in which light passing through the higher propogation loss polysilicon waveguide 180 is coupled to the lower propogation loss nitride waveguide 190 to allow for longer distance travel. As illustrated in FIGS. 27A, 27B, and 27C, this coupling can be arranged, depending on the structure of the polysilicon waveguide 180, in a manner in which the polysilicon waveguide 180 terminates at the point of coupling to the nitride waveguide 190 (FIG. 27A), can be a coupling based on a terraced polysilicon waveguide 180 (FIG. 27B), or can be arranged such that the polysilicon waveguide 180 continues to carry a portion of the light, past the area of coupling to the nitride waveguide 190, thereby providing a hybrid waveguide. The structure illustrated in FIGS. 28 and 29 can be fabricated using conventional CMOS processing techniques to produce the structures illustrated. Although the illustrated structure has been primarily described as passing light from the lower level (FEOL) polysilicon waveguide 180 into the upper level (BEOL) silicon nitride waveguide 210, it should be apparent from the foregoing discussion that the light from the upper level nitride waveguide 210 can be passed to the lower level polysilicon waveguide 180 as well.

The FIG. 28, 29A, 29B structure shows various photonic devices which can be integrated on the photonics device portion of the integrated circuit. These are examples of various types of photonic structures which can be created and are not in any manner limiting of the invention. Likewise, the illustrated transistor structures are examples of different types of electrical devices which can be integrated as part of a CMOS circuit in the overall optoelectronic structure. Moreover, although the upper nitride waveguide 190 is formed of a nitride material, it can be formed of other materials which have a lower optical transmission loss than polysilicon. Suitable materials for this waveguide include silicon dioxide, as well as other dielectric materials. Moreover, while a specific processing sequence has been described and illustrated, many changes can be made, including rearranging the order of the processing steps, except where a processing step must logically follow a preceding processing step, and/or adding or omitting processing steps. Accordingly, while various embodiments of the fabrication method and resulting structure have been described and illustrated above, they are in no manner limiting of the invention as modifications can be made without departing from the spirit or scope of the invention. Accordingly, the invention is not limited by the foregoing description, but is only limited by the scope of the appended claims.

What is claimed as new and desired to be protected by Letters Patent of the United States is:

1. An integrated structure comprising:
   a photonic structure comprising:
      a first waveguide having a first core of a first material, the first waveguide having a first light propagation loss parameter; and
      a second waveguide having a second core of a second material different from the first material, the second waveguide having a second light propagation loss parameter lower than the first light propagation loss parameter
      the second waveguide being located above and evanescently coupled to the first waveguide; and
   an electronic structure comprising transistors having gates, wherein the first core is at a level of integration corresponding to the same level of integration as the transistor gates.

2. The integrated structure as in claim 1, wherein the first material comprises polysilicon.

3. The integrated structure as in claim 2, wherein the second material comprises silicon nitride.

4. The integrated structure as in claim 2, wherein a cladding surrounds the first material, at least a portion of the cladding comprises silicon nitride.

5. The integrated structure as in claim 4, wherein another portion of the cladding comprises an oxide.

6. The integrated structure as in claim 1, wherein at least one of the first and second waveguides comprises an inwardly tapering profile along at least a portion of its longitudinal extent to increase light coupling between the first and second waveguides.

7. The integrated structure as in claim 6, wherein the first waveguide comprises the inwardly tapering profile.

8. The integrated structure as in claim 7, wherein the first waveguide comprises a terraced inwardly tapering profile.

9. The integrated structure as in claim 6, wherein both the first and second waveguides comprise inwardly tapering profiles at least where the second waveguide is located above the first waveguide.

10. The integrated structure as in claim 1, wherein the first and second waveguide cores are separated by at least an oxide material.

11. The integrated structure as in claim 1, wherein the first and second waveguide cores are separated by at least an intervening oxide material.

12. The integrated structure as in claim 1, wherein the first waveguide core is integrated over a substrate on which electronic circuits are also integrated.

13. The integrated structure as in claim 12, wherein the first waveguide core is formed of the same material as used to form the transistor gates.

14. The integrated structure as in claim 12, wherein the second waveguide core is integrated over the substrate at a level of integration above transistors of the electronic circuits.

15. The integrated structure as in claim 14, further comprising an oxide material over the gates of transistors, wherein the second waveguide core is formed above the oxide material.

16. The integrated structure as in claim 15, wherein the second waveguide core is formed on the oxide material.

17. The integrated structure as in claim 1, wherein the first and second waveguides are configured such that light passing through the first waveguide exits the first waveguide and passes through the second waveguide.

18. The integrated structure as in claim 1, wherein the first and second waveguides are configured such that a first portion of light passing through the first waveguide exits the first waveguide and passes through the second waveguide and a second portion of light passing through the first waveguide continues to pass along the first waveguide.

* * * * *